United States Patent
Bröcker et al.

(10) Patent No.: US 6,436,873 B1
(45) Date of Patent: Aug. 20, 2002

(54) IMPREGNATING PROCESS FOR THE APPLICATION OF ACTIVE COMPOSITION TO STRUCTURED SUPPORTS OR MONOLITHS

(75) Inventors: Franz Josef Bröcker, Ludwigshafen; Ekkehard Schwab, Neustadt, both of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/333,705

(22) Filed: Jun. 16, 1999

(30) Foreign Application Priority Data

Jun. 19, 1998 (DE) .......................................... 198 27 385

(51) Int. Cl.⁷ ................................................ B01J 37/02
(52) U.S. Cl. ................ 502/439; 502/325; 502/328; 502/330; 502/339
(58) Field of Search ................ 502/439, 325, 502/328, 330, 339

(56) References Cited

U.S. PATENT DOCUMENTS

| 4,171,289 A | * | 10/1979 | Wheelock |
| 4,256,609 A | | 3/1981 | Dale et al. .................. 252/455 |
| 4,686,202 A | * | 8/1987 | Broecker et al. |
| 4,746,537 A | | 5/1988 | Takeuchi |
| 5,077,093 A | | 12/1991 | Baumgartner |
| 5,413,984 A | * | 5/1995 | Marecot et al. |
| 5,668,077 A | * | 9/1997 | Klopries et al. |
| 5,866,734 A | * | 2/1999 | Flick et al. |
| 5,900,386 A | | 5/1999 | Freund et al. .............. 502/330 |

FOREIGN PATENT DOCUMENTS

| DE | 41 35 055 | 5/1993 |
| DE | 4410353 | 9/1994 |
| EP | 56 435 | 7/1982 |
| EP | 68 862 | 1/1983 |
| JP | 61271034 | 12/1986 |
| JP | 62071540 | 4/1987 |
| JP | 2261542 | 10/1990 |
| JP | 7-108173 | * 4/1995 |

OTHER PUBLICATIONS

OZ 43551, BASF, U.S. Ser. No. 08/035,659. No date available.

* cited by examiner

Primary Examiner—Steven P. Griffin
Assistant Examiner—Christina Ildebrando
(74) Attorney, Agent, or Firm—Keil & Weinkauf

(57) ABSTRACT

Active compositions are deposited by means of an impregnating process onto structured supports, where the impregnating medium has a surface tension of not more than 50 mN/m. Monoliths are made from the structured supports thus produced. The structured supports or the monoliths are used as catalysts in chemical processes.

5 Claims, 1 Drawing Sheet

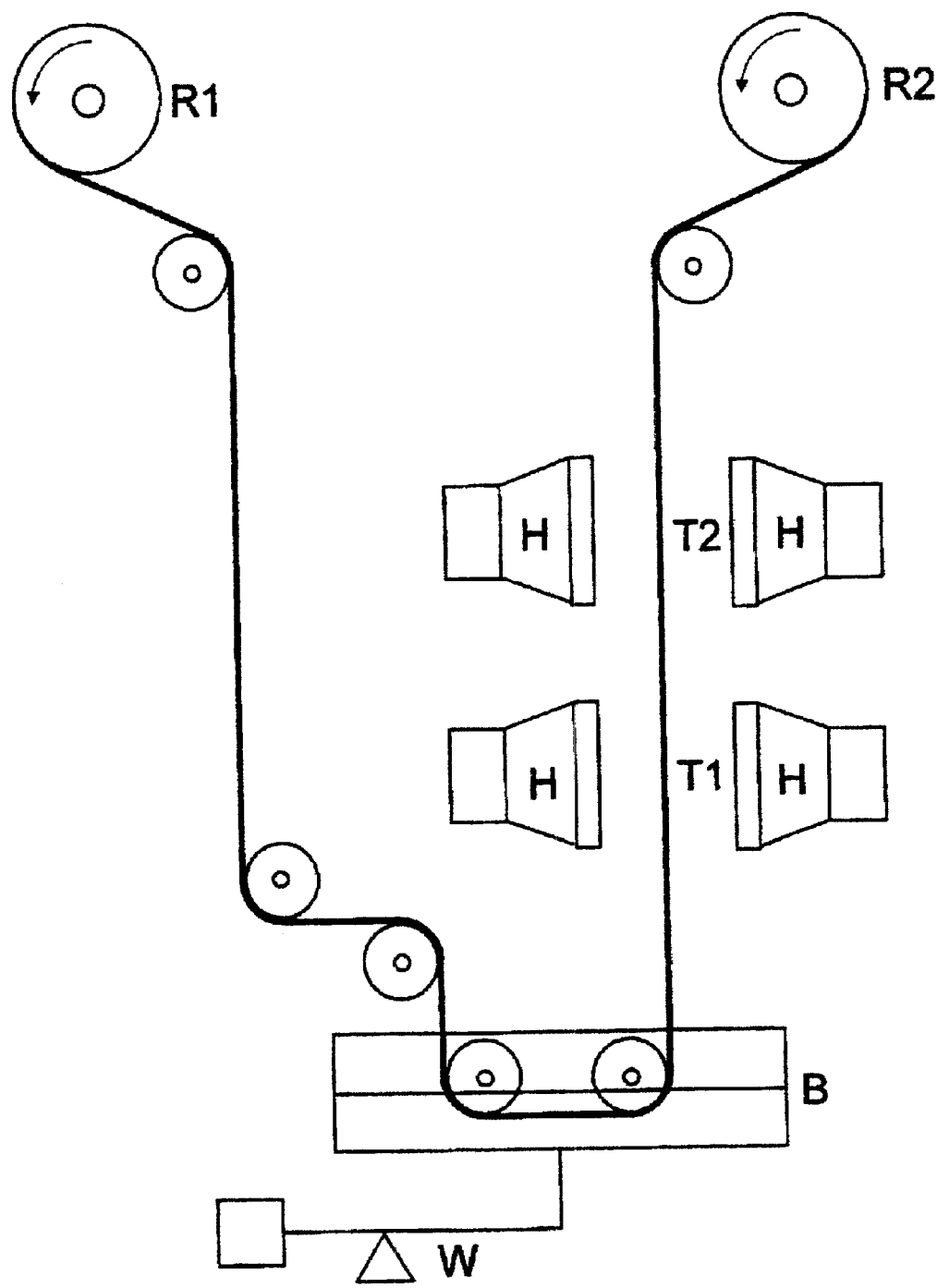

IMPREGNATING PROCESS FOR THE APPLICATION OF ACTIVE COMPOSITION TO STRUCTURED SUPPORTS OR MONOLITHS

The present invention relates to an impregnating process for the application of active composition to structured supports or monoliths. Furthermore it relates to catalytically active structured supports and monoliths which are produced by means of this process and to processes in which they are used as catalysts.

By structured supports we mean, within the scope of this invention, supports having a regular two-dimensional or three-dimensional structure, which thus differ from particulate supports used as a bulk bed. Examples of structured supports are supports composed of threads or wires, mostly in the form of supporting webs, such as woven fabrics, single-thread or multi-thread knit fabrics, or felts, or metal plates, which may exhibit recesses, such as perforated plates or expanded metal. Such substantially two-dimensional, structured supports can be converted to three-dimensional structures, so-called monoliths, having a shape appropriate to their end use, which structures can then be used as, say, catalyst packs or column packings. Packings may be composed of more than one monolith. Alternatively, monoliths need not be composed of two-dimensional supporting webs, but can be made directly, without inter-mediate stages, such as is the case with ceramic monoliths having flow channels, these being known to the person skilled in the art.

Active compositions can be applied to structured supports or monoliths so as to impart catalytic activity to the structured supports or monoliths. By active compositions we mean catalytically active substances or mixtures of substances containing at least one catalytically active ingredient. They can in addition contain further catalytically active ingredients, auxiliary substances and/or promoters for influencing the catalytic properties such as selectivity, activity and/or on-stream time. Catalytically active structured supports or catalytically active, monoliths are used eg in processes in which the use of a bulk catalyst bed is disadvantageous for example for fluid dynamic or reaction-kinetic reasons. Typical fields of application are their use for exhaust gas purification, primarily in automobiles, their use as catalyst packs in vapor-phase or liquid phase reactors or their use as column packings in reactive distillations.

Various techniques are known for application of active compositions to structured supports and for the production of catalytically active monoliths composed thereof, or for application of active compositions to monoliths.

Thus EP-A 198,435 discloses the vapor deposition of catalytically active substances and promoters onto net-like or woven supports. Catalyst packs for the detoxication of exhaust gas are prepared from these vacuum-metallized support materials. EP-A 564,830 teaches the production of catalyst packs, known as monoliths, by tempering a metallic support mate-rial in air, cooling, coating the support material with active components and promoters by vapor deposition in vacuo followed by cutting, shaping and processing to form monoliths. EP-A 412,415 teaches the vapor deposition of palladium and a metallic inhibitor to a structured support and also the use of the thus prepared catalysts for the hydrogenation of triple bonds to double bonds, eg hydrodehydrolinalool to hydrolinalool.

By the use of vapor deposition it is possible to apply the active composition to the support materials, very uniformly and normally without the formation of agglomerates of undesirable magnitude, in the form of firmly adhering fine particles, which method is, however, relatively time-consuming and technically elaborate, particularly when relatively large amounts of active composition are to be applied. The vapor deposition must be carried out in vacuo, which requires a batch process involving comparatively long set-up times, or high vacuum pump capacities in continuous plants. There has thus been no lack of attempts to prepare the active composition by the impregnating process well known to the person skilled in the art from the manufacture of catalysts on bulk supports in particulate form.

For this purpose a so-called "wash coat" is frequently applied to a pre-formed monolith, this being a coating composed of a finely divided oxidic catalyst-supporting powder, which is in turn coated with catalytically active substances. This mostly takes place by impregnation of the monolith with a suspension which contains the oxidic powders already provided with active composition, or the oxidic powders and precursors of the active composition, drying and, where applicable, conversion of the precursors to the active composition. Conventional processes for the application of wash coats are disclosed eg in DE-A 4,135,055 and DE-A 3,915,685. U.S. Pat. No. 4,746,537 discloses a process for coating a ceramic monolith with γ-aluminum oxide precipitated in situ from the vapor phase. The monolith thus coated with finely divided alumina is then impregnated with a solution of salts of catalytically active metals, dried and calcined.

Wash-coated monoliths however show unsatisfactory properties, usually due to the fact that when the coating is applied by impregnation under active flow conditions precipitation preferentially takes place at the upstream end of the monolith or when the monolith is lifted out of a non-flowing impregnation bath precipitation preferentially takes place at that end of the monolith which is last in contact with the liquor, and in addition, there is poor adhesion of such a coating. As a result, comparatively large amounts of catalytically active material can become detached and, eg in the case of an automobile, be removed through the exhaust or, in the case of a chemical plant, be deposited at some other site. Such deposits can consititute a considerable safety risk, particularly when they catalyze exothermal reactions at an uncooled site.

Thus the attempt has also been made to apply active material or a pulverulent support material for active material to structured support materials, using an impregnating process, prior to shaping of the latter to form monoliths.

EP-A 68,862 discloses the preparation of units comprising on the one hand hydrophilic woven, knitted or felted fabrics of textile material, and on the other hand, open-mesh hydrophobic material coated with catalytically active substances, the catalytically active substances—ie platinum crystallites on a finely divided carbon support—being applied as aqueous suspension to the hydrophobic material and fixed by drying and sintering at elevated temperature. EP-A 56,435 teaches a continuous process in which metallic webs are passed through a dip bath, in which they are coated with an adhesive resistant to high temperature, eg a ceramic adhesive, and are then coated with a granular support material for the catalytically active substances. The substances deposited in the dip bath are then dried and the metallic web is fabricated to form monoliths These impregnating processes suffer from the drawback, however, that the applied substances are not deposited on the structured support uniformly and or in uniform particle size. The particles always agglomerate to form comparatively large lumps. Such agglomeration is accompanied by a loss of active surface, and the activity of such catalysts is therefore always unsatisfactory. Furthermore, such agglomerated material as occurs in wash coats readily detaches itself from the support, particularly when the structured supports provided with active composition are being processed to form the monoliths, but also during industrial use of the monoliths, which likewise leads to the drawbacks described above with respect to wash coats.

Thus the problem to be solved is to find an industrially simple process for the application of catalytically active substances to structured supports, which avoids the drawbacks of the known processes.

Accordingly, we have found an impregnating process for the application of catalytically active substances to structured supports or monoliths, which is characterized in that an impregnating medium having a surface tension of not more than 50 mN/m is used. Furthermore we have found monoliths produced by means of the impregnating process of the invention or composed of catalytically active structured supports prepared by means of the impregnating process of the invention, and also heterogeneously catalyzed processes in which these structured supports or these monoliths are used as catalyst.

The drawing illustrates a specific embodiment of the impregnating process of the invention.

The impregnating process of the invention is industrially simple to carry out and leads to a surprisingly homogenous deposition of very small and firmly adhering particles of active substance, without agglomeration occurring. Comparatively large amounts of active composition can be deposited in a simple manner. The catalytically active structured supports produced by the impregnating processes of the invention can be shaped to catalytically active monoliths without noticeable detachment of active composition, and these monoliths can be used as catalysts for chemical reactions without active composition being removed to any appreciable extent The structured supports used are usually substantially two-dimensional structured supports, eg woven fabrics, single-thread or multi-thread knit fabrics, felts, films, plates, perforated plates or expanded metal. However, the process is equally suitable for applying active composition to three-dimensional structures such as monoliths.

The materials used for the supports are selected from metallic or ceramic materials or plastics depending on the conditions existing during preparation and processing thereof and, above all, during the use thereof. Examples of metallic materials are pure metals such as iron, copper, nickel, silver, aluminum, and titanium or alloys such as steels, for example nickel, chromium, and/or molybdenum steel, brass, phosphor bronze, monel and/or nickel silver. Examples of ceramic materials are alumina, silicon dioxide, zirconium(IV) oxide, cordierite, steatite and/or carbon. Examples of plastics materials are polyamides, polyethers, polyvinyls, polyethylene, polypropylene, polytetrafluoroethylene, polyketones, polyetherketones, polyethersulfones, epoxide resins, alkyd resins, urea resins and/or melamine aldehyde resins.

Preferably there are used metallic structured supports in the form of metallic wovens, knits or felts, carbon fiber wovens or felts or man-made wovens or knits.

Optionally the support is pretreated prior to application of the active composition. Pretreatment is advantageous, for example, when it is desirable to improved the adhesion of the active composition to the support. Examples of pretreatment are coating of the support with adhesion promoters or roughening by mechanical techniques (for example grinding, sandblasting) or thermal techniques such as heating, usually in air, plasma etching or cathodic etching.

In a particularly preferred embodiment metallic structured supports are used which are composed of wires, which in turn consist of high-grade steel, which exhibits a roughened surface when tempered in air and subsequently cooled. This property is particularly evident in high-grade steels in which one alloying ingredient accumulates at the surface above a specific de-mixing temperature and forms a tenacious rough oxidic surface layer in the presence of oxygen, due to oxidation. Such an alloying ingredient can be aluminum or chromium for example, from which there forms a corresponding surface layer of $Al_2O_3$ or $Cr_2O_3$. Examples of such steels are those having the material numbers 1.4767, 1.4401, 1.4301, 2.4610, 1.4765, 1.4847 and 1.4571 (as specified in German Standard DIN 17007). These steels are thermally roughened by known methods (cf eg EP-A 564, 830) by tempering in air at from 400° to 1100° C. over a period of from one hour to 20 hours followed by cooling to ambient temperature.

The supports are impregnated with an impregnating medium which contains the active composition, its constituents, the precursors of the active composition and/or the precursors of said constituents. If the impregnating medium contains precursor compounds, these are converted during further processing to form the active composition. Normally, the active composition, its constituents, the precursors of the active composition and/or the precursors of said constituents are dissolved and/or suspended in a solvent or suspending agent, but it is equally possible to carry out the process without solvents or suspending agents, eg by using a liquid precursor of the active composition which has the required surface tension.

The impregnating medium has a surface tension of not more than 50 mN/m. In a preferred embodiment the impregnating medium has a surface tension of not more than 40 mN/m and in a particularly preferred embodiment, not more than 35 mN/m. Generally, no lower limit is imposed on the value of the surface tension. However in a preferred embodiment the impregnating medium has a surface tension of at least 10 mN/m, and in a particularly preferred embodiment it is at least 25 mN/m.

The surface tension is measured by the OECD ring method known to the person skilled in the art (ISO 304, cf The Official Journal of the European Communities No. L 383 of 29.12.1992, pages A/47 to A/53).

A solvent or suspending agent present in the impregnating medium is selected such that the active composition that is to be applied, its components and/or its/their precursors undergo no undesirable reactions in or with said solvent or suspending agent; further criteria for selection are cost and ease of handling. Suitable solvents or suspending agents are well-known and industrially commonly used solvents, eg aromatic or aliphatic hydrocarbons such as benzene, toluene, xylene, cumene, pentane, hexane, heptane, hydrocarbon cuts such as benzin, ligroin, petroleum white oil, alcohols, diols, polyalcohols such as methanol, ethanol, the two propanol isomers, the four butanol isomers, glycol, glycerol, ethers such as diethyl ether, di-n-butyl ether, methyl-tert-butyl ether, ethyl-tert-butyl ether, methyl-tert-amyl ether, ethyl-tert-amyl ether, diphenyl ether, ethyleneglycoldimethyl ether, diethyleneglycoldimethyl ether, triethyleneglycoldimethyl ether, or water. The organic solvents or suspending agents used may be substituted, if desired, eg with halogens, as in chlorobenzene, or with nitro groups, as in nitrobenzene. The solvents or suspending agents are used individually or intermixed.

In a preferred embodiment the solvent or suspending agent used is water.

The active composition, its constituents, the precursors thereof and/or the constituents thereof are suspended and/or dissolved in the solvents or suspending agents. In the simplest case, the active composition or the constituents thereof is/are dissolved and/or suspended in a solvent or suspending agent. For example, soluble active compositions or the soluble components thereof are dissolved in a solvent, or finely powdered, insoluble active compositions or the individual components thereof are suspended in a suspending agent. Alternatively, precursors cursors of the active composition or the constituents thereof are dissolved and/or suspended in a solvent or suspending agent. Precursors are converted to the final active composition during further processing. It is equally possible to use, in the impregnating medium, part of the active composition in the form of precursors and part as finished components of the active composition.

The impregnating medium additionally contains, if necessary, auxiliary substances. For example, the impregnating medium contains acid-reacting or alkaline-reacting compounds or buffers, if they are necessary or advantageous for stabilizing or solubilizing the active composition or at least one of the components or precursors thereof or their precursors present in the medium.

Preferably soluble salts of the components of the active composition are completely dissolved in a solvent. Advantageously, there is used an aqueous solution of components of the active composition.

If the active composition consists of metals, it is particularly preferred to use either an aqueous nitric-acid solution of nitrates of the metals or an aqueous ammoniacal solution of amine complexes of the metals. If the active composition consists of amorphous metal oxides, use is preferably made of an aqueous sol of the oxide, which sol may be stabilized.

The active composition is selected according to its end use; suitable active compositions for the various areas of application are known to the person skilled in the art. For the removal of nitrogen oxides from burner gases there are used eg pulverulent active compositions containing titanium(IV) oxide and vanadium oxide. For hydrogenating reactions there are used mostly metals as the active composition, frequently Group 8b metals, eg iron, cobalt, nickel, ruthenium, rhodium, platinum, palladium and/or iridium, which are optionally doped with other metals acting as promoters, eg alkali metals and/or alkaline earth metals such as lithium, sodium, potassium, rubidium, cesium, magnesium, calcium, strontium and barium, coinage metals such as copper, silver and/or gold, zinc, tin, bismuth, antimony, molybdenum, tungsten, and/or contain other promoters such as sulfur and/or selenium.

If water is used as the solvent or suspending agent, the surface tension is usually only just below the value for pure water (72 mN/m). If the surface tension of the impregnating medium is above the upper limit of 50 mN/m set by the invention, at least one additive capable of reducing the surface tension is added to the impregnating medium in an amount which lowers the surface tension to the desired value. The surface tension-reducing additive is a surface-active substance. The surface-active substance added is usually at least one anionic or non-ionic surfactant. Preferably there are used non-ionic surfactants and more preferably low-foam non-ionic surfactants. The quantity of surfactant to be used is determined in each case by carrying out a few simple experiments. Usually additions of from 0.01 to 1 wt % of a surfactant factant or surfactant mixture, based on the total weight of the impregnating solution, suffice, and it is preferred to use from 0.05 to 0.2 wt % of surfactant.

Anionic, non-ionic and low-foam surfactants are widely used commercial substances well known to the person skilled in the art. Non-ionic surfactants are available eg under the trade name LUTENSOL® and low-foam non-ionic surfactants under the trade name PLURAFAC® sold by BASF Aktiengesellschaft, Ludwigshafen, or under other trade names of numerous other suppliers.

The structured support is impregnated with the impregnating medium in known manner. For this purpose the structured support is either dipped in the impregnating medium or washed or sprayed therewith.

The impregnated support is usually dried in known manner following impregnation, in order to free it from solvent or suspending agent. This is generally carried out by heating the impregnated support, in order to evaporate the solvent or suspending agent. Simultaneously or instead, a vacuum can be applied. In the case of impregnation with aqueous solutions and/or suspensions it is generally sufficient to heat the support to at least 100° C. to approximately 120° C.

Following drying, or concurrently with drying in a single step, precursor compounds which can be thermally decomposed to the active composition, are thermally decomposed to the active composition ("calcined") in known manner. To this end, the impregnated and optionally dried support is heated to an adequate temperature. The temperature suitable for this purpose is determined by routine tests. Generally temperatures in the range of from 120° C. to 650° C. are sufficient, and usually temperatures in the range of from 120° C. to 400° C. are adequate.

The temperature may be attained in any type of oven or by using unenclosed radiators. It should in each case be set such that the material of the support remains stable at the temperature used. In the case of plastics materials there is therefore automatically an upper limit to the temperature which can be used, this being dependent on the plastics material itself, conforming to its maximum temperature resistance as given in data sheets or compiled tables for the plastics material concerned.

Precursor compounds which cannot be thermally decomposed to the active composition are, instead of thermal decomposition, converted to the active composition by suitable chemical treatment, concurrently with, or subsequently to, said heat treatment. For example, metal nitrates are decomposed during said heat treatment generally to oxides, which, normally following the heat treatment, undergo reduction by treatment with a reducing agent for the metal. The metal oxide in the finished monolith is reduced in simple manner to the metal with hydrogen or a hydrogen-containing gas mixture before the monolith is used as catalyst in the reactor.

During the drying procedure, the solvent or suspending agent used substantially evaporates, whilst during calcination and/or chemical after-treatment the final active composition is produced from precursors of the active composition, components thereof and/or precursors of said components.

A two-dimensional support substantially structured as a supporting web is shaped in known manner, usually following the heat treatment, to a three-dimensional entity appropriate to its end use. Shaping takes place eg in separate steps such as trimming, corrugation of the web, arranging and fixing the corrugated webs to form a monolith having parallel or crisscross channels. Shaping of the web to form a monolith may be carried out, if desired, prior to impregnation, drying, heat treatment or chemical treatment.

The impregnating process of the invention is carried out continuously or batchwise.

A continuous embodiment is illustrated diagrammatically by way of example in the drawing. A supporting web travels at a known velocity from roll $R_1$ via a system of deflection and tension rolls through bath B containing the impregnating medium. The concentration of active composition, the components thereof, precursors or their components and also any auxiliary substances in the impregnating medium, is known. Bath B rests on balance W to enable measurement of the quantity of impregnating medium absorbed by the supporting web. Following impregnation, the supporting web passes successively through two heating zones in which radiant heaters H heat the supporting web first to a drying temperature $T_1$ and then to a calcining temperature $T_2$. On leaving the heating zones the supporting web coated with active composition cools down and is collected on roll $R_2$ for further processing. The quantity of active composition deposited on the supporting web can be calculated from the known concentration of the active composition or its precursors in the impregnating medium and the weight measurements carried out via balance W. The deposited quantity of active composition is governed by the concentrations in the impregnating medium and the residence time of the supporting web in the impregnating medium, which is in turn governed by the velocity of the supporting web and/or the size of the vessel containing the impregnating medium. For entirely continuous operation, the impregnating medium is fed continuously to the impregnating vessel at a replenishment rate based on the weight of impregnating medium absorbed by the supporting web.

The monoliths of the invention are prepared as described above from the structured supports coated with active composition by the impregnating process of the invention. It is possible to make the monoliths from uncoated supporting webs or, in particular, to take ceramic monoliths, made by some other commonly used process, eg casting or extrusion, and then to coat said monoliths with active composition by means of the impregnating process of the invention. The monoliths usually have open channels which are, in use, parallel to the main direction of flow or at an angle thereto. The general forms of monoliths, their structures, processes for the preparation thereof and their installation as catalyst packs or column packings are known to the person skilled in the art.

The heterogeneously catalyzed processes of the invention are characterized in that at least one structured supporting web coated with active composition by means of the impregnating process of the invention or at least one monolith of the invention is used in said processes as the catalyst. Examples of heterogeneously catalyzed processes of the invention are hydrogenations of organic compounds or reactive distillations in which a monolith of the invention or a packing composed of monoliths of the invention is used. Generally a structured supporting web coated with active composition by the impregnating process of the invention or a monolith of the invention can be used in any process in which catalytically active structured supporting webs or monoliths are used. Specific processes are eg the hydrogenation of multiple bonds in organic molecules, such as the hydrogenation of 2-butyne-1,4-diol to 2-butene-1,4-diol and/or butane-1,4-diol, the hydrogenation of vinyl oxirane to butylene oxide, of dihydrofuran to tetrahydrofuran, of reactive diolefins and olefins in C5+ streams such as pyrolysis gasoline, reformed gasoline or coke-oven benzene, of vinyl acetylene in C4 streams to 1,3-butadiene and/or butenes, of butadiene in C4 streams to butenes, of propyne and/or propadiene in C3 streams to propene. These processes can be carried out in a packed-bed reactor or in a packed reactive distillation column with simultaneous separation of substances ("catalytic distillation").

EXAMPLES

Example 1

A 20 cm wide woven metal web in plain weave, composed of material No. 1.4301 and having a mesh size of 0.18 mm and a wire diameter of 0.105 mm, was tempered for 3 hours at 800° C. in a muffle furnace. On cooling to room temperature the fabric thus pretreated was wound onto roll $R_1$ of the impregnating equipment illustrated diagrammatically in the drawing and attached to roll $R_2$ by two wires.

Vessel B was filled with an aqueous impregnating solution prepared from palladium nitrate, silver nitrate and distilled water and containing 0.144 wt % of palladium and 0.0365 wt % of silver. To reduce the surface tension to 29.4 mN/m there was added to the impregnating solution 0.1 wt % of the low-foam non-ionic surfactant PLURAFAC® LF 131 (obtainable from BASF Aktiengesellschaft, Ludwigshafen). By means of a motor connected to roll $R_2$, the fabric was pulled through the bath containing the impregnating solution and wound onto roll $R_2$ at a velocity of 1.6 meters per minute. During the process 0.1197 g of palladium and 0.0303 g of silver per square meter were taken up by the fabric.

By means of two radiant heaters the temperature in drying zone $T_1$ was adjusted such that the woven web had a temperature of 110° C. on leaving zone $T_1$.

The impregnated and dried fabric was then calcined in air for one hour at 300° C.

The woven web was then partially corrugated by means of a toothed roll, and one corrugated and one uncorrugated strip were placed one on the other and rolled up together. The resulting cylindrical monolith having a height of 200 mm and a diameter of 25.5 mm was fastened by spot welding. This shaping procedure produced no abrasion products or metal dust.

The monolith thus produced was designated "monolith A".

Comparative Example 1

As in Example 1, a 20 cm wide woven metal web in plain weave composed of material No. 1.4301 and having a mesh size of 0.18 mm and a wire diameter of 0.105 mm was tempered for 3 hours at 800° C. in a muffle furnace. This woven metal web was then vacuum-metallized in a manner similar to the process of Example 1 of EP-A 412,415 in a UHV vapor deposition unit (roller coater) equipped with two sputter electrodes first with 0.138 g/m² of palladium and then with 0.0195 g/m² of silver, in a single run. The vacuum-metallized fabric was then calcined by heating over a period of 3 hours in air at 300° C. and then shaped to form a monolith as described in Example 1. The monolith was designated "monolith VA".

Example 2

In a manner similar to that described in Example 1, a woven web of material 1.4767 tempered at 900° C. was treated with an aqueous impregnating solution containing palladium nitrate and zinc nitrate and having a surface tension which had been lowered to 29.5 mN/m by the addition of 0.1 wt % of the non-ionic surfactant LUTENSOL® LF 131 (obtainable from BASF Aktiengesellschaft, Ludwigshafen). The solution contained 1.734 wt % of palladium and 0.266 wt % of zinc, and, per square meter, 1.603 g of palladium, and 0.246 g of zinc were taken up by the woven web. Calcination was effected differently from Example 1 by heating for 2 hours at 250° C. and for a further two hours at 350° C. The web was shaped to a monolith following impregnation, drying and calcination.

The monolith thus obtained was designated "monolith B".

No agglomerates could be seen on the support in a scanning electron micrograph.

Comparative Example 2

Example 2 was repeated except that no surfactant was added to the impregnating solution. The surface tension of the impregnating solution was 69.6 mN/m. The woven web absorbed 1.674 g of palladium and 0.257 g of zinc per square meter.

The monolith thus prepared was designated "monolith VB".

A scanning electron micrograph revealed agglomerates of the active composition on the support, primarily at the crossover points of the metal threads.

Example 3

A 15 m long and 20 cm wide strip of woven metal fabric in plain weave composed of material No. 1.4767 and having a mesh size of 0.18 mm and a wire diameter of 0.112 mm was tempered for 5 hours at 900° C. in a muffle furnace. On cooling to room temperature the fabric thus pretreated was wound onto roll $R_1$ of the impregnating equipment illustrated diagrammatically in the drawing and attached to roll $R_2$ by two wires.

Vessel B was filled with an aqueous nickel nitrate solution prepared from 101.83 g of $Ni(NO_3)_2 \cdot 6H_2O$ and 898.17 g of distilled water and having a surface tension which had been lowered to 30 mN/m by the addition of 0.05 wt % of LUTENSOL LF (obtainable from BASF Aktiengesellschaft, Ludwigshafen). By means of a motor connected to roll $R_2$, the fabric was pulled through the bath containing the impregnating solution and wound onto roll $R_2$ at a velocity of 1.5 meters per minute. During the process 287 g of the nickel nitrate solution were absorbed by the fabric, this being equivalent to 1.92 g of nickel per square meter.

By means of two radiant heaters, the temperature in drying zone $T_1$ was adjusted such that the woven web had a temperature of 110° C. on leaving zone $T_1$. By means of two radiant heaters, the temperature in drying zone $T_2$ was adjusted such that the woven web had a temperature of 350° C. on leaving this zone.

The woven web was then partially corrugated by means of a toothed roll, and one corrugated and one uncorrugated strip were placed one on the other and rolled up together. The resulting cylindrical monolith was fastened by spot welding. This shaping procedure produced no abrasion products or nickel dust.

Example 4

Monoliths A, VA, B and VB were used as follows in the selective batch hydrogenation of hydrodehydrolinalool to hydrolinalool:

Each monolith was installed in a hydrogenating unit equipped with liquid reflux and gas recirculating means and prereduced by treatment with hydrogen for one hour at 80° C.

Then hydrodehydrolinalool was added and hydrogenated in ascending mode with product recycling and gas recirculation. The cross-sectional space velocity for liquid and gas was 200 $m^3/m^2 \cdot h$. The space-time yield measured in kg of product per liter of catalyst per hour is a measure of the activity of the catalyst.

The results of the hydrogenation experiments are summarized in the following table.

TABLE

| Monolith | Active composition | | | | Addition of surfactant [wt %] | Space-time yield [kg/L$_{cat.}$ · h] |
|---|---|---|---|---|---|---|
| A  | Pd | 0.1197 | Ag | 0.0303 | 0.1 | 1.30 |
| VA | Pd | 0.138  | Ag | 0.0195 | —   | 1.05 |
| B  | Pd | 1.603  | Zn | 0.246  | 0.1 | 2.50 |
| VB | Pd | 1.674  | Zn | 0.257  | 0   | 1.43 |

The results of the hydrogenation experiments show that the monoliths prepared by means of the impregnating process of the invention show distinctly better properties and are, in particular, much more active than the comparable monoliths prepared by means of vapor deposition or by means of a conventional impregnating technique.

Furthermore the examples show that the impregnating process of the invention suppresses the formation of agglomerates.

We claim:

1. A deposition process for coating a structured support or monolith which is composed of threads or wires, woven fabrics, single-thread or multi-thread knit fabrics, felts or metal plates with an active composition present only as a coating on said support or monolith, comprising contacting said support or monolith with a deposition medium containing completely dissolved soluble salts of the components of the active composition and having a surface tension of not more than 50 mN/m.

2. The deposition process of claim 1, wherein said deposition medium has a surface tension of not more than 35 mN/m.

3. The deposition process of claim 1, wherein the surface tension of the deposition medium is adjusted to not more than 50 mN/m by the addition of a surface-active substance.

4. The deposition process of claim 3, wherein the deposition medium is an aqueous solution containing at least one metal nitrate and at least one surfactant.

5. The process of claim 1 wherein said structured support is a non-particulate support which has a regular substantially two-dimensional or a three-dimensional structure.

* * * * *